(12) United States Patent
Andel

(10) Patent No.: US 9,041,401 B2
(45) Date of Patent: May 26, 2015

(54) DETECTOR WITH A TELESCOPIC ANTI-TWIST CARRIER/GUIDE ROD

(71) Applicant: VALLON GMBH, Eningen (DE)

(72) Inventor: Benjamin Andel, Tubingen (DE)

(73) Assignee: Vallon GmbH, Eningen (DE)

( * ) Notice: Subject to any disclaimer, the term of this patent is extended or adjusted under 35 U.S.C. 154(b) by 35 days.

(21) Appl. No.: 14/080,993

(22) Filed: Nov. 15, 2013

(65) Prior Publication Data

US 2014/0143984 A1   May 29, 2014

(30) Foreign Application Priority Data

Nov. 27, 2012 (DE) ................. 20 2012 104 609 U

(51) Int. Cl.
*G01V 3/08* (2006.01)
*B25G 1/04* (2006.01)
*G01V 3/15* (2006.01)
*F16B 7/14* (2006.01)

(52) U.S. Cl.
CPC ................. *B25G 1/04* (2013.01); *Y10T 16/473* (2015.01); *F16B 7/14* (2013.01); *G01V 3/15* (2013.01)

(58) Field of Classification Search
CPC ........................................................ G01V 3/08
USPC ......................................................... 324/326
See application file for complete search history.

(56) References Cited

U.S. PATENT DOCUMENTS 4,622,766 A * 11/1986 Hall ................................ 37/308
2004/0145369 A1 * 7/2004 Sowers et al. .................. 324/329

FOREIGN PATENT DOCUMENTS

| DE | 86 34 267 U1 | 2/1987 |
|---|---|---|
| DE | 3 722 961 A1 | 1/1989 |
| DE | 3 917 351 A1 | 11/1990 |
| DE | 43 18 563 C2 | 12/1994 |
| DE | 1 941 885 U | 7/1996 |
| DE | 29 813 686 U1 | 11/1998 |
| EP | 0 520 534 A1 | 12/1992 |
| EP | 0 858 761 A1 | 8/1998 |
| EP | 884609 A1 * | 12/1998 |

OTHER PUBLICATIONS

Partial Machine Translation of EP 884609 A1, Dec. 1998.*
European Search Report for corresponding European Application No. EP 13 40 1102 dated Feb. 6, 2014.
German Search Report for corresponding German Application No. 20 2012 104 609.1 filed on Nov. 27, 2012.
European Search Report for corresponding European Application No. EP 13 40 1102 dated Feb. 6, 2014 (Previously Submitted).

* cited by examiner

*Primary Examiner* — Bot Ledynh
(74) *Attorney, Agent, or Firm* — Renner, Otto, Boisselle & Sklar, LLP

(57) ABSTRACT

A detector with a telescopic carrier/guide rod on which at one end a measuring probe is disposed, whereby the carrier/guide rod comprises at least two anti-twist tubes longitudinally movable and lockable in one another, which form an outer tube and an inner tube, whereby the tubes comprise a linear sliding guide as an anti-twist lock relative to one another. The linear sliding guide comprises at least one longitudinal rib extending inside over the entire length of the outer tube and at least one rib guide extending outside over a partial length of the inner tube on the insertion side of tube end with a recess with which the longitudinal rib engages. The rib guide is formed by a guide sleeve, which is divided in a circumferential direction.

6 Claims, 3 Drawing Sheets

DETECTOR WITH A TELESCOPIC ANTI-TWIST CARRIER/GUIDE ROD

CROSS-REFERENCE TO RELATED APPLICATION

The present application claims priority under 35 USC §119 to German Patent Application No. 20 2012 104 609.1, filed Nov. 27, 2012, the entire disclosure of which is incorporated herein by reference.

TECHNICAL FIELD OF THE INVENTION

The invention relates to a detector with a telescopic carrier/guide rod on which at one end a measuring probe is disposed, whereby the carrier/guide rod comprises at least two anti-twist rods lockable relative to one another and longitudinally movable in one another, forming an outer tube and an inner tube, whereby the tubes comprise a linear sliding guide as an anti-twist lock.

DESCRIPTION OF THE RELATED ART

Such detectors are well known in various embodiments and applications. Exemplary reference is drawn to hand-held iron and metal detectors that are meant for the detection of metallic objects—such as munitions hidden in the ground, and which work on a magnetic or electromagnetic basis. The telescopic carrier/guide rod allows the displacement of the tubes relative to one another, thus adapting the detector to different operating conditions and heights of the user which facilitates ergonomic handling. With the two or several tubes guided longitudinally movably in one another, of which two respectively form an outer tube and an inner tube directly adjacent to one another in a radial direction, the respective outer tube usually comprises, at its insertion side tube end facing the measuring probe, a locking device for the sliding inner tube, with which the inner tube and the outer tube is lockable against longitudinal displacement relative to one another.

Known detectors of the kind cited from the outset usually comprise a handle at the other end of the carrier/guide rod besides the measuring probe disposed at the front end of the carrier/guide rod; said handle facilitating the guidance of the detector during the search. The handle and the measuring probe are exactly aligned to one another in a defined manner facilitating the ergonomic handling of the detector. Their alignment to one another is independent of the adjusted length of the telescopic carrier/guide rod and should remain unchanged when shifting the inner tube and the outer tube relatively to one another. From the patent document DE 43 18 563 C2 a generic carrier/guide rod with an anti-twist lock for the respective outer tube relative to the respective inner tube is known.

The carrier/guide rod disclosed there consists of at least two rods movable in one another, whereby a groove and feather guide is effective between the two tubes respectively movable directly inside one another. Here, a web is provided on one of the two tubes respectively movable directly inside one another, extending in the longitudinal direction, which engages directly or indirectly in a guide groove on the other tube. Thus, it is ensured during longitudinal displacement that the inner tube cannot twist relative to the outer tube, so that its angular position is always guaranteed for all tubes comprising the carrier/guide rod. The handle at the extreme outer tube stands, for example, perpendicularly on this tube towards the top while the probe attached to the innermost inner tube is aligned so that its probing surface spreads horizontally.

Seen in this state of the art as a disadvantage is that the guide rib is provided on the outer circumference of the respective inner tube and the guide groove is provided on the inner circumference of the locking device, and that the guide rod is made as a separate part and bonded into a longitudinal groove milled into the respective inner tube. Therewith the manufacture of the anti-twist lock is complicated, impeded and cost-intensive.

From the above-cited state of the art, the object of the invention is to propose a simpler and more economical solution for the anti-twist lock.

SUMMARY OF THE INVENTION

Thus, the rods of the detector according to the invention comprise a linear sliding guide as an anti-twist lock, which guides the respective outer tube relative to the movable inner tube directly therein in an anti-twist manner. Thus the change of length of the telescopic carrier/guide rod can be undertaken without problems, without the alignment of the measuring probe changing relative to the extreme outer tube on the rear end of the carrier/guide rod, on which a handle is optionally disposed. Under the term—linear sliding guide—in this context a technical linear element is understood, which enables a frictionless translation of the tubes of the detector and at the same time guarantees retention of the axial direction of motion, i.e. a linear path. Such linear sliding guides are based on at least two guide elements, for example guide rails or in the simplest case—a groove-feather system with clearance.

In accordance with the invention, the linear guide comprises at least a longitudinal rib disposed on the interior wall of the outer tube and at least a rib guide on the outside circumference of the inner tube, whereby the rib guide comprises a recess in which the longitudinal rib engages axially movably. At the same time, the longitudinal rib is formed inside on the outer tube and/or on the inner tube/outer tube, whereby the tubes are made of wrapped or extruded metal tubes or wrapped, injected or extruded plastic tubes.

Therefore the recess that forms the rib guide can be produced, in a simple manner, by reworking the outside circumference of the respective inner tube and/or inner tube/outer tube.

The longitudinal rib extends internally over the entire length of the outer tube and the rib guide extends externally over a partial length of the inner tube. The length of the longitudinal rib is determined by the manufacturing process of the rods and does not require rework of any kind and manner. The rib guide that is formed by a guide sleeve on the outside circumference of the inner tube, is restricted to an exact length necessary to guide the longitudinal rib so that on the one hand the smoothness of movement of the respective inner tube is guaranteed relative to the outer tube and on the other hand to avoid unnecessary extra work when manufacturing the rods. The guide sleeve is divided in the circumferential direction of the inner tube.

In the detector according to the invention, the rib guide is disposed on the insertion-side end of the inner tube. At the same time, the rib guide can be formed by a guide sleeve disposed on the outside circumference of the inner tube that comprises a number of guide ribs of the outer tube corresponding to the number of recesses or a number of shell-shaped guide sleeve segments corresponding to the number of the guide ribs of the outer tube disposed in the circumferential direction spaced from one another, by which the gaps extending especially axially form the recesses. The disposition of the rib guide on the tube end simplifies the manufacture of at least one recess for at least one longitudinal rib and/or the assembly of the guide sleeve with respect to the guide sleeve segments outside on the respective inner tube. The use of similar guide sleeve segments between the tubes means simplification of the manufacture. At the same time, the guide sleeve and/or the guide sleeve segments made of metal, plastic or any other convenient material can be produced by machining and/or plastic moulding.

In a preferred embodiment, the guide sleeve is or the guide sleeve segments are unmovably fixed at the inner tube outside by holding plug pins that engage into holding breakthroughs of the inner tube. The holding breakthroughs can be generated especially easily and economically as borings. The holding plug pins are favourably formed on the guide sleeve on the circumference side facing the inner tube, whereby the guide sleeve and the guide sleeve segments are preferably of plastic material made in the injection moulding process. The holding plug pins therewith hardly cause additional costs. Moreover, an easy and fixed assembly of the guide sleeve by axial sliding on the inner tube and the guide sleeve segments is possible by radial placement on the inner tube. A press seat of the holding plug pins in the holding breakthroughs is not necessary in both cases; a slide seat suffices. Especially the guide holding segments are secured in position in a radial direction by the respectively mounted outer tube.

In a preferred variant of the invention, the face side of the guide sleeve facing away from the insertion-side end of the inner tube or the guide sleeve segments forms a limit stop for the push-over side of the outer tube end. It is obvious that the outer tube at this point must comprise a counter limit stop that interacts with the end limit stop. The counter limit stop, for example, can be realised economically without any problems on the locking device disposed there.

Preferably, the guide sleeve or the guide sleeve segments comprise longitudinal elevations extending axially from one another in a circumferential direction spaced on the outside circumference assigned to the outer tube. The longitudinal elevations form sliding supports for the respective outer tube surrounding the inner tube and enable the outer tube to shift axially relative to the inner tube with minimum force requirement. Moreover, the gaps between the longitudinal elevations serve as a scavenging space for any dirt particles that have infiltrated.

The invention is explained in detail below based on an exemplary embodiment depicted in the drawing. Further features of the invention are derived from the following description of the exemplary embodiment of the invention in connection with the claims and the attached drawing. The individual features of the invention can be implemented as a single entity or combined to implement different embodiments of the invention.

DETAILED DESCRIPTION OF THE INVENTION

Figure 1:
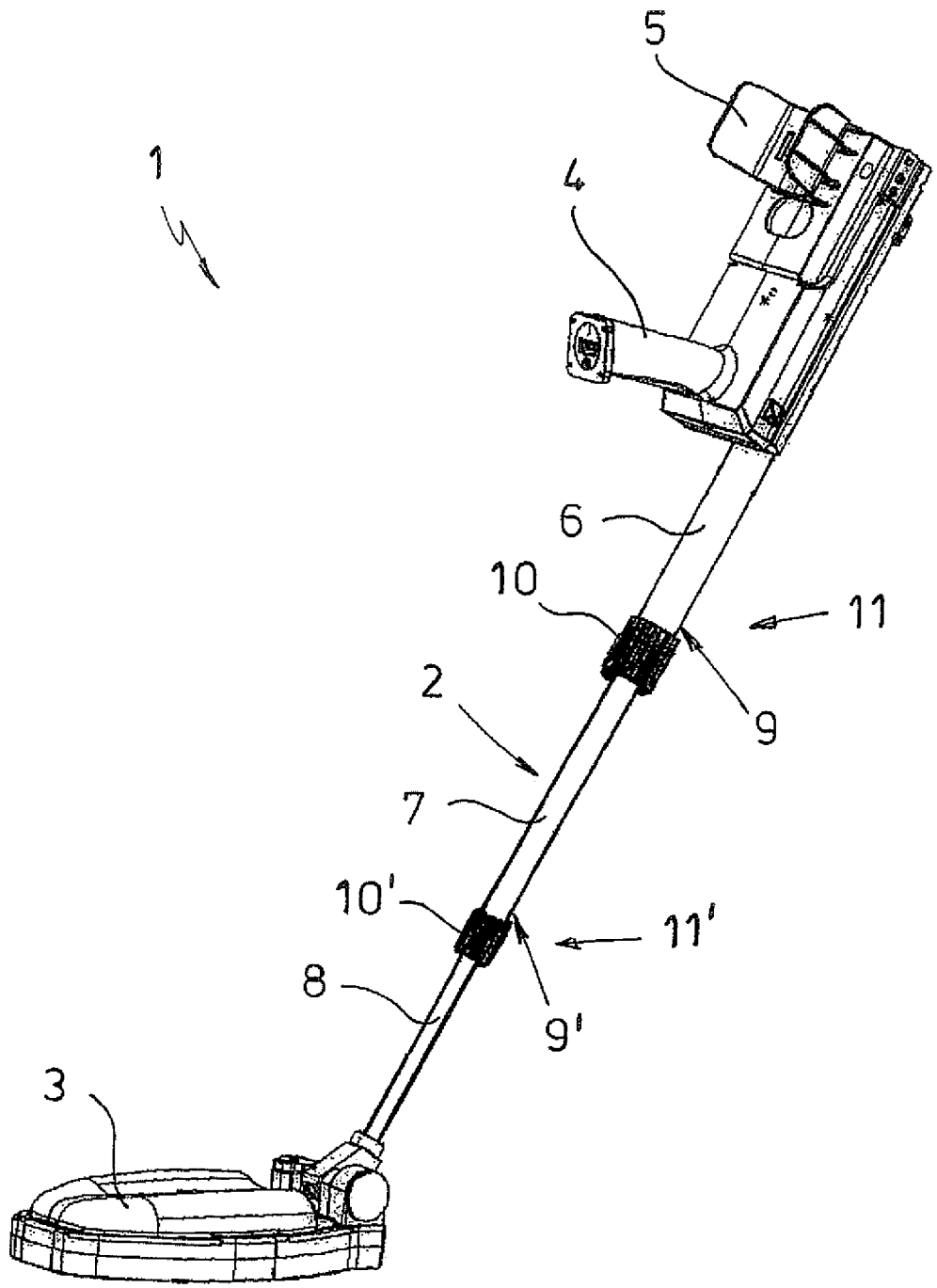
FIG. 1 a detector according to the invention with telescopic carrier/guide rod in perspective view.

FIG. 1 comprises a detector 1 according to the invention, with a telescopic carrier/guide rod 2 on which a measuring probe 3 is disposed and on its other end a handle 4 is disposed near a forearm support 5. The carrier/guide rod comprises three tubes 6, 7, 8 guided in one another longitudinally movably, whereby the tube 6 is a pure outer tube and the tube 8 is a pure inner tube and whereby the tube 7 forms an inner tube 7 for the outer tube 6 and an outer tube 7 for the inner tube 8. A locking device 10, 10' is disposed on the sliding side tube end 9, 9' of the tube 6 and/or 7 respectively, with which the innermost inner tube 8 can be fixed on the middle tube 7 and the tube 7 on the outermost outer tube 6 in any relative position. The locking devices 10, 10' on the clamping areas 11, 11' are represented in the drawing only schematically with the same mechanism, and are depicted identically apart from the size.

Figure 2:
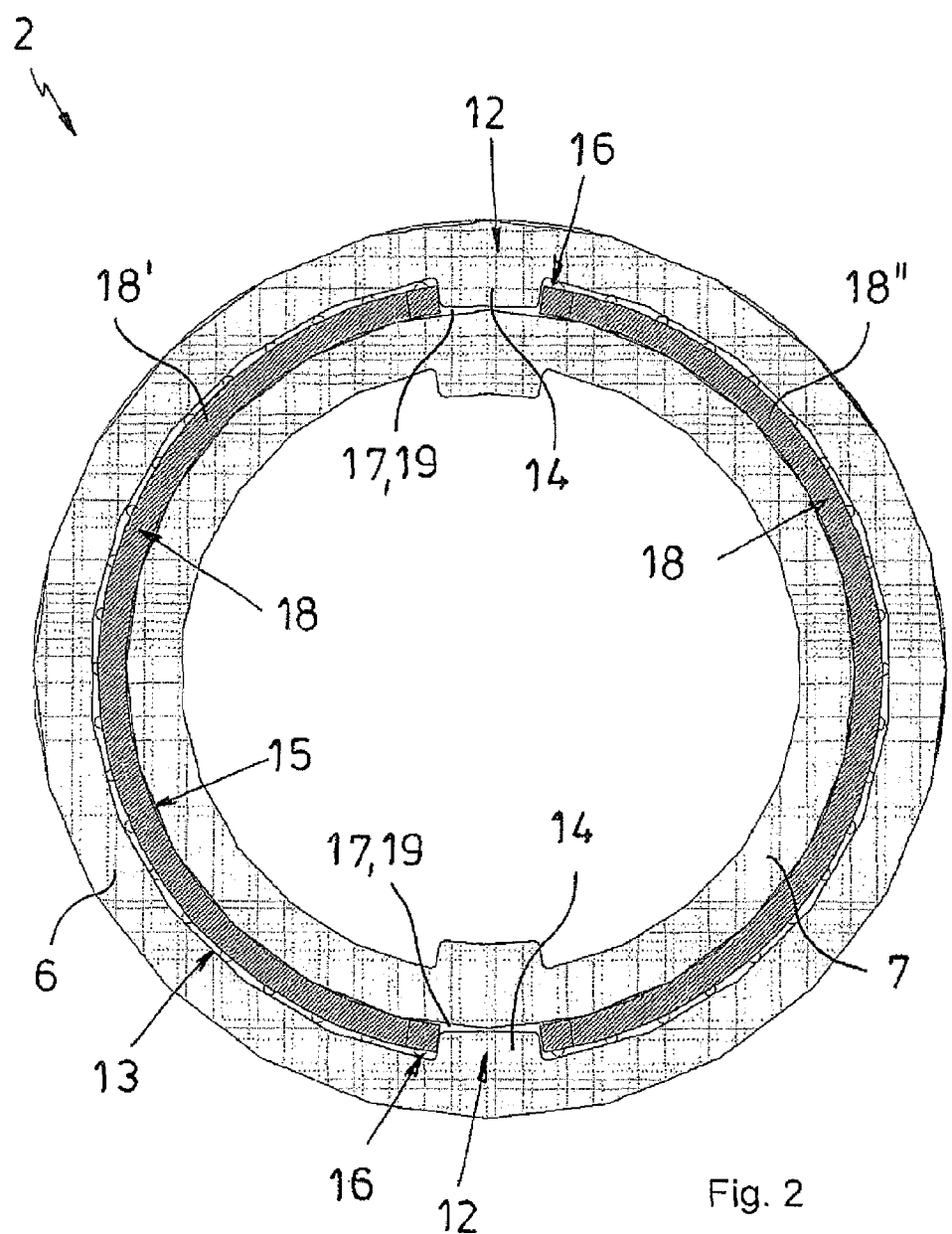
FIG. 2 the carrier/guide rod from FIG. 1, with an outer tube and an inner tube in a sectional representation in the linear sliding guide area formed by one of the two guide sleeve segments and a longitudinal rib.

In FIG. 2, the telescopic carrier/guide rod 2 is shown in a cross-section representation. It is to be recognised that the inner tube 7 is disposed longitudinal movably inside the outer tube 6 in an overlapping and anti-twist manner over a linear guide 12. The outer tube 6 comprises two longitudinal ribs 14 formed on the inner wall 13 that extend inside over the entire length of the outer tube 6. The inner tube 7 is equipped on the outside circumference and/or the outer wall 15 with a rib guide 16 for the longitudinal rib 14 that extends externally only over a partial length of the inner tube 7. The rib guide 15 comprises two recesses 17 with which both longitudinal ribs 14 engage axially movably. The rib guide 16 is formed at the same time of two guide sleeve segments 18', 18", spaced from one another in a circumferential direction by which gaps 19 form the recesses 17. Both guide sleeve segments 18', 18" together depict a guide sleeve 18 divided in a circumferential direction.

Figure 3:
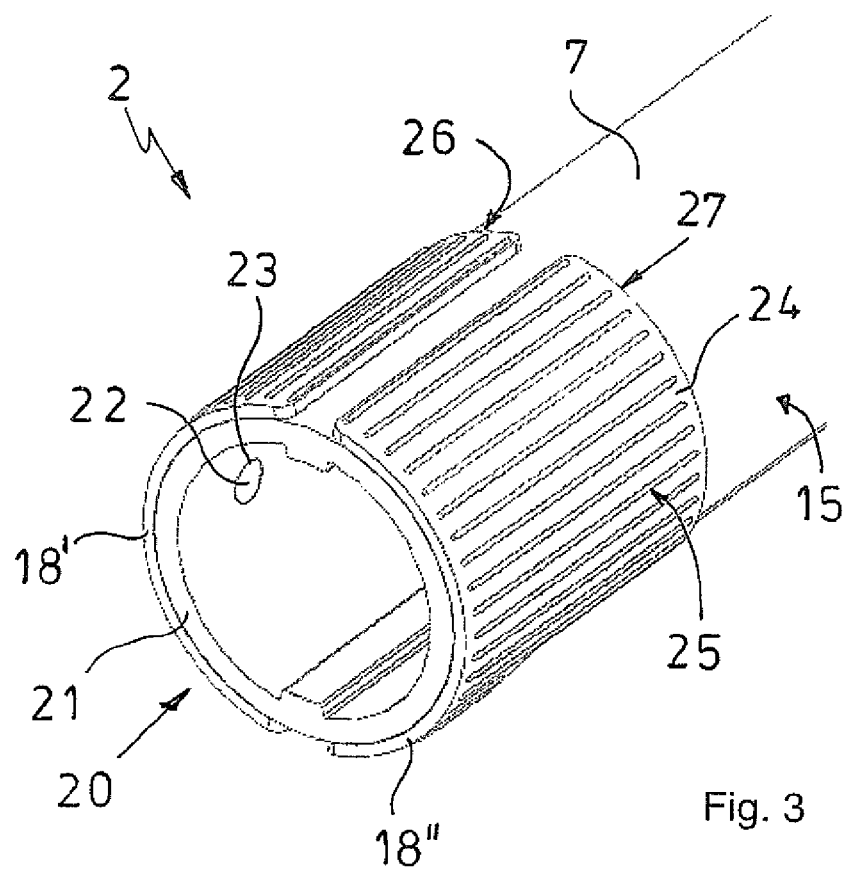
FIG. 3 the inner tube from FIG. 2 with the attached guide sleeve segments.
Figure 4:
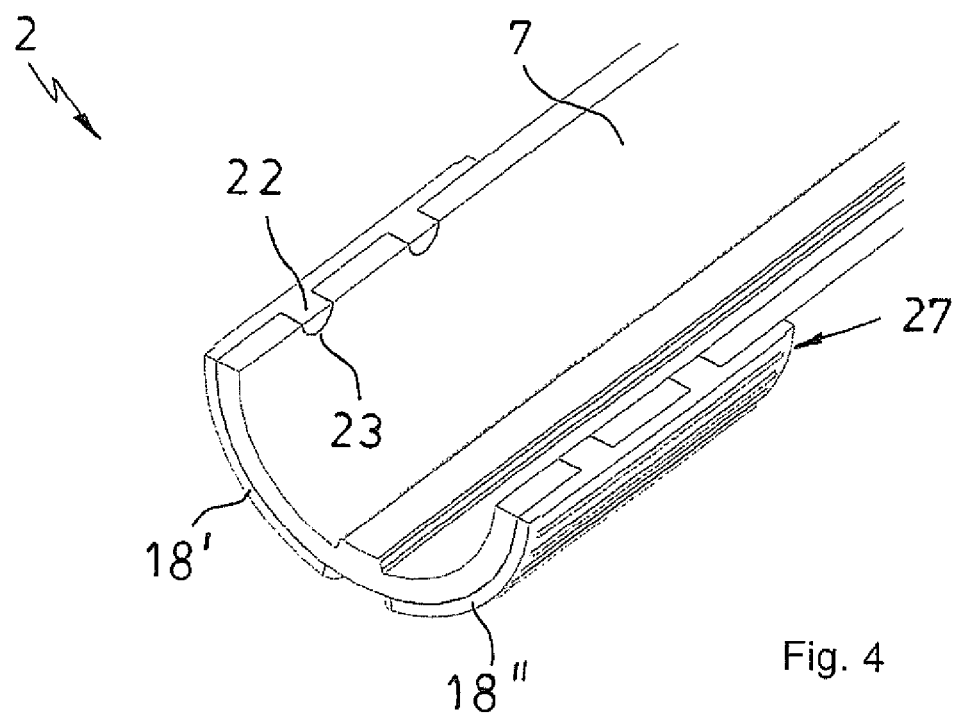
FIG. 4 the inner tube from FIG. 3 in longitudinal sectional representation.

FIG. 3 comprises the inner tube 7 in perspective representation without the outer tube 6. The guide sleeve segments 18', 18" disposed directly at the insertion side of tube end 20 lie flush with the face side 21 of the inner tube 7. The guide sleeve segments 18', 18" are held fixed on the inner tube 7 by means of holding plug pins 22 that engage with the holding breakthroughs 23 of the inner tube 7. As can be derived from FIG. 4, the holding plug pins 22 are formed inside on the guide sleeve segments 18', 18" and comprise a diameter that corresponds to the boring diameter of the holding breakthroughs 23.

The guide sleeve segments 18', 18" comprise axially extending longitudinal elevations 25 as sliding support for the outer tube 6 spaced from one another in a circumferential direction on the outer wall 24 assigned to the outer tube 6. The face side 26 of the guide sleeve segments 18', 18" facing away from the insertion side of the tube end 20 forms a limit stop 27 for the push-on tube end 9 of the outer tube 6 visible only in FIG. 1. That outer tube 6 comprises a counter limit stop for the end limit stop 27, for example, which can be part of the locking device 10.

The invention claimed is:

1. A detector with a telescopic carrier/guide rod, on which at an end a measuring probe is disposed, whereby the carrier/guide rod comprises at least two anti-twist rods lockable relative to one another and longitudinally movable in one another, which form an outer tube and an inner tube, whereby the rods comprise a linear sliding guide as anti-twist lock relative to one another, wherein the linear sliding guide at least comprises one longitudinal rib disposed on the inside wall of the outer tube and at least one rib guide disposed on the outer circumference of the inner tube, whereby the rib guide comprises a recess, with which the longitudinal rib engages, whereby the longitudinal rib extends internally over the entire length of the outer tube and the rib guide extends externally over a partial length of the inner tube on the insertion side tube end of the inner tube, and where the rib guide is formed of a guide sleeve disposed on the outside circumference of the inner tube, which is divided in a circumferential direction.

2. The detector according to claim 1, wherein the guide sleeve comprises a number of recesses corresponding to the number of the longitudinal ribs of the outer tube.

3. The detector according to claim 1, wherein the guide sleeve comprises a number of shell-shaped guide sleeve segments disposed spaced from one another in the circumferential direction corresponding to the number of longitudinal ribs of the outer tube, in which gaps form the recesses.

4. The detector according to claim 2, wherein the guide sleeve respectively the guide sleeve segments is/are fixed on the inner tube by means of holding plug pins that engage with holding breakthroughs of the inner tube.

5. The detector according to claim 1, wherein the face side of the guide sleeve or the guide sleeve segments facing away of the insertion side tube end of the inner tube form/s the limit stop for the push-on side tube end of the outer tube.

6. The detector according to claim 3, wherein the guide sleeve or the guide sleeve segments comprise/s on the outer wall being assigned to the outer tube axially extending longitudinal elevations spaced from one another in circumferential direction.

\* \* \* \* \*